United States Patent

Ffowcs Williams et al.

[11] Patent Number: 4,557,106
[45] Date of Patent: Dec. 10, 1985

[54] COMBUSTION SYSTEM FOR A GAS TURBINE ENGINE

[76] Inventors: John E. Ffowcs Williams, 298 Hills Rd., Cambridge; Philip J. Dines, 86 The Green, Aston Abbots, Aylesbury, Buckinghamshire, both of England; Maria A. Heckl, Kronprinzenstrasse, 41-43, 1000 Berlin 20, Fed. Rep. of Germany

[21] Appl. No.: 665,154

[22] Filed: Oct. 26, 1984

[30] Foreign Application Priority Data

Nov. 2, 1983 [GB] United Kingdom ............... 8329218

[51] Int. Cl.⁴ .................................. F02C 7/045
[52] U.S. Cl. ......................... 60/39.281; 60/261; 60/725
[58] Field of Search ............ 60/39.281, 261, 725; 181/206, 207, 213, 220, 221

[56] References Cited

U.S. PATENT DOCUMENTS

| | | | |
|---|---|---|---|
| 2,911,788 | 11/1959 | Lewis et al. | 60/725 |
| 2,941,356 | 6/1980 | Blackman | 60/725 |
| 3,053,047 | 9/1962 | Bodemuller | 60/39.281 |
| 3,245,219 | 4/1966 | Warden et al. | 60/39.281 |
| 3,620,013 | 11/1971 | Rogers et al. | 60/725 |

*Primary Examiner*—Louis J. Casaregola
*Attorney, Agent, or Firm*—Cushman, Darby & Cushman

[57] ABSTRACT

A combustion system for gas turbine engines incorporates a feedback loop which provides positive damping for the control of unstable combustion, particularly buzz in reheat systems, but also at least some cases of combustion rumble in main combustion systems. The feedback loop includes a sensor, a control unit and an exciter. The control unit monitors the strength of the sensor signal, which senses a cyclically varying parameter of the unstable combustion process, and adaptively varies the amount by which the signal is phase-shifted and amplified in order to obtain a sensor signal of minimum strength, this being achieved by controlling the exciter in accordance with the phase-shifted amplified signal to change the boundary conditions of the combustion process and thereby eliminate the unstable combustion.

12 Claims, 3 Drawing Figures

Fig. 1.

COMBUSTION SYSTEM FOR A GAS TURBINE ENGINE

The present invention relates to combustion systems for gas turbine engines, and in particular is concerned with the control of the phenomenon of unstable combustion as manifested for example in so-called "reheat buzz" and "combustion rumble".

Reheat buzz is the name given to the noise generated by combustion-driven oscillations in a reheat combustion system. It includes vibration of flame gutters and other components of the reheat combustion system. The oscillations are liable to be unstable and can grow in amplitude until they pose a threat to the integrity of the system, either in the short term through excessive streses in the components or in the longer term through excessive reductions in fatigue life.

It is already known to reduce reheat buzz by either re-designing the combustor or by scheduling engine thrust increases to avoid combustion conditions known to produce a severe buzz problem for the particular system configuration being considered. However, such measures increase weight and expense or limit the rate of increase of thrust achievable on a reheated engine. Further, even the continuance of a less severe problem is undesireable because it still results in long term metal fatigue, albeit at a reduced level.

Combustion rumble is the name given to the noise generated by temporary flow reversals in the main combustion chambers of gas turbine engines. These transient flow reversals are undesireable because they can limit the performance of the engine, but their causes are not fully known. It seems possible that unstable combustion of the fuel mixture in the combustion chambers is one cause of combustion rumble, but hitherto there has been no means of tackling the problem other than by redesign of components.

The present invention tackles the problem of unstable combustion in gas turbine engines—whether in the main combustion system or in the reheat combustion system—by adaptively changing the boundary conditions of the combustion process in accordance with variations in at least one chosen parameter thereof.

According to the present invention a combustion system for a gas turbine engine incorporates a feedback loop for the control of unstable combustion in the combustion system, the feedback loop including:

sensor means for sensing a cyclically varying parameter of the unstable combustion process and producing a signal corresponding thereto;

control means for phase-shifting and amplifying the signal from the sensor means; and exciter means for changing the boundary conditions of the combustion process in accordance with the phase-shifted amplified signal;

said control means including adaptive means for monitoring the strength of the sensor signal and varying the amount by which the signal is phase-shifted and amplified to obtain a sensor signal of minimum strength, whereby said unstable combustion is substantially eliminated.

In more detail, the control means may conveniently comprise:

low pass filter means adapted to pass a predetermined range of frequencies of the cyclically varying parameter of the unstable combustion process;

a variable phase shifter for phase-shifting the signal from the sensor means by a variable amount;

a variable gain amplifier for amplifying the phase-shifted signal by a variable amount; and a supervisory unit for monitoring the strength of the signal from the low pass filter and altering the gain of the variable gain amplifier and the phase change produced by the variable phase shifter until the signal from the low pass filter is at a minimum.

The sensor means may comprise various types of transducers capable of providing the control means with an electrical signal which follows the combustion process parameter being monitored; for example, vibration, pressure, noise (sound pressure) or optical transducers may be used.

Again, various types of transducer may be utilised as exciter means, according to the way in which it has been decided to change the boundary conditions of the combustion process. For example, transducers may be used which modulate the flow of a fluid participating in the combustion process. Modulation of flow can be achieved by producing pressure fluctuations in the fluid, and in one embodiment of the invention, a reciprocating element, such as an electromagnetically driven diaphragm, is utilised to superimpose pressure fluctuations on the fuel supply to the combustion process. An alternative embodiment utilises an exciter in the form of a loudspeaker type of transducer in order to produce fluctuations in sound pressure level in and near the combustion process.

Embodiments of the invention will now be described by way of example only with reference to the accompanying drawings, in which FIG. 1 is a schematic part cross-sectional representation of a gas turbine engine fitted with a main combustion system and a reheat combustion system according to the present invention;

Figure 1:
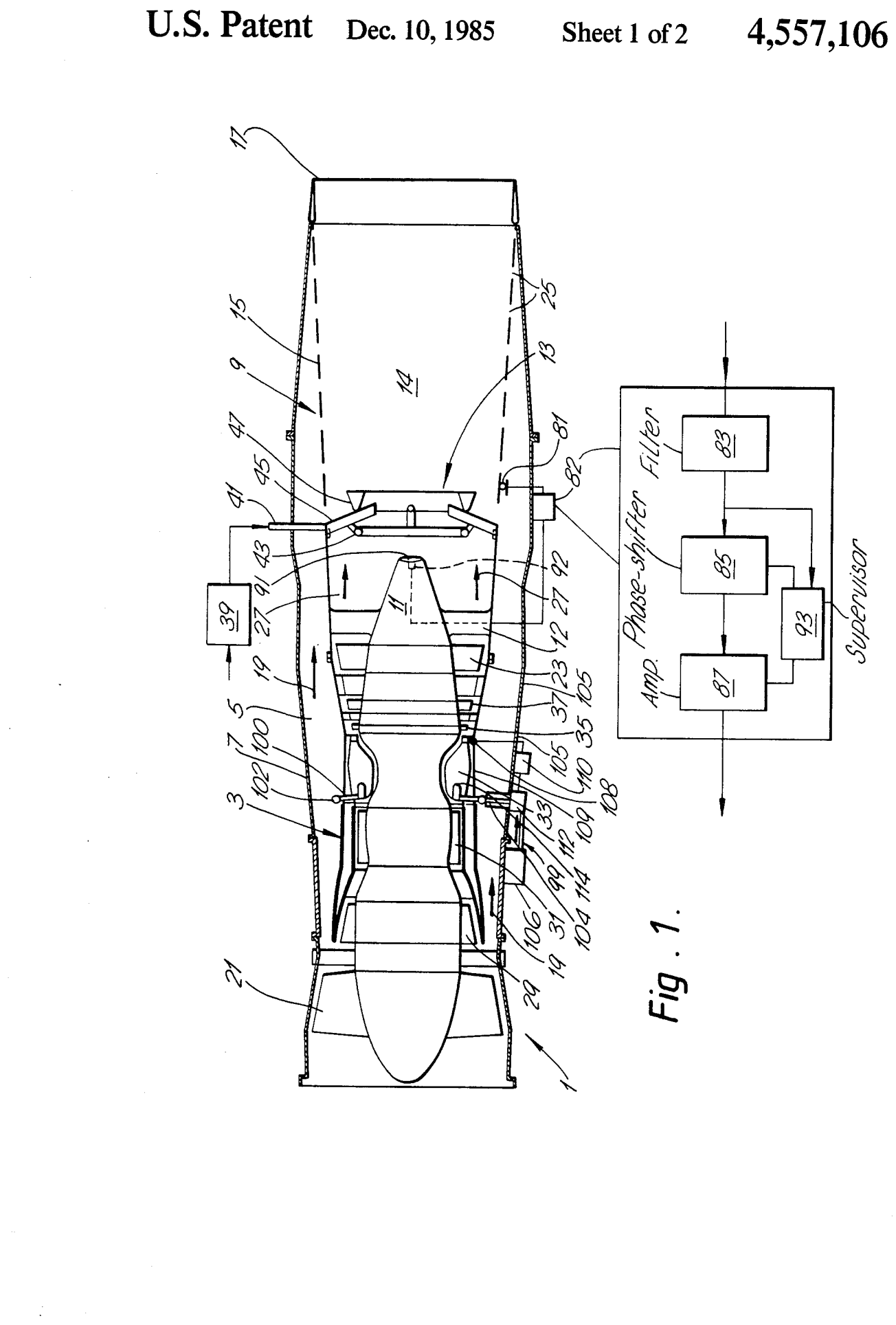
Figure 2:
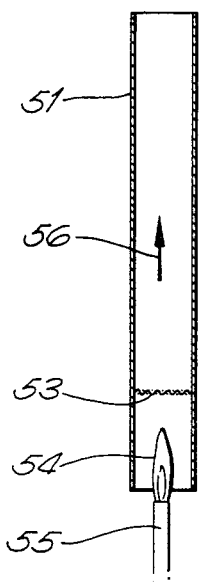
FIG. 2 is a cross-sectional diagram of a conventional Rijke tube apparatus.

Referring now to FIG. 1, there is shown a bypass gas turbine aeroengine 1 fitted with a main combustion system and a reheat combustion system according to the present invention. The aeroengine 1 comprises an engine core 3, a bypass duct 5 defined by an outer casing 7 which surrounds the core 3, and a reheated exhaust system 9 including a rear exhaust cone 11 on core engine 3, a reheat combustor 13 within jet pipe 14, an exhaust mixer annulus 15 and a final propulsive nozzle 17. The bypass duct 5 is supplied with bypass air 19 from a front fan 21, which also supplies core 3, the fan 21 being driven by a shaft (not shown) connected to a final turbine section 23 of core 3. The bypass air 19 passes through apertures 25 in mixer annulus 15 at the end of the bypass duct and mixes with at least the outer regions of the hot turbine exhaust gases 27 issuing from engine core 3 before the combined flow passes to atmosphere.

The engine core 3 comprises intermediate pressure compressor section 29, which receives low pressure air from fan 21, high pressure compressor section 31, annular combustion chamber 33, high pressure turbine section 35, intermediate pressure turbine section 37 and low pressure turbine section 23 mentioned previously. Fuel flow to the combustion chamber 33 is controlled by a fuel supply system 99.

For a large proportion of operating time, all the thrust of the engine 1 is provided by burning fuel in combustion chambers 33. The fuel passes to chambers 33 down fuel feed arms 100 which are joined at their outer ends to a common fuel manifold 102 encircling engine core 3. The fuel manifold is fed from a main fuel feed pipe 104 encased in a streamlined shroud which extends across the bypass duct 5 from the outer casing of the engine 1. The feed pipe 104 accepts fuel coming from the main fuel control unit 106.

The installation is prone to the phenomenon known as combustion rumble. In this particular instance the phenomenon is caused by unstable combustion in the combustion chambers 33 producing temporary reversals in the flow of gases through the chambers. The exact physical process whereby such unstable combustion arises in the combustion chambers 33 is currently disputed.

When more thrust is required from the aeroengine 1 than can be obtained by burning fuel in combustor section 33 alone, the reheat combustor 13 is brought into operation. A reheat fuel control unit 39 in the engine's fuel system allows fuel to flow through feed pipes 41 to a circular fuel manifold 43 supported by struts 45 concentrically within the jet pipe 14. The feed pipes 41 are shrouded by struts 45. Fuel is sprayed into the flame area from holes (not shown) in the downstream edge of the manifold. A flame retaining gutter or stabiliser 47 comprises a V-section annular ring located downstream of the manifold 43 to provide a region in which turbulent eddies are formed to assist combustion and create a region of reduced flow velocity to prevent the reheat flame being blown out by the turbine exhaust gases 27.

Reheat combustion systems generally are prone to suffer from reheat buzz, and it is known that this is associated with dynamically unstable combustion in the system. The exact physical process whereby such instability arises is currently in dispute.

It is here contended that in both cases of unstable combustion described above, the process by which the unstable combustion arises is analogous to that occuring in a Rijke turbe, as shown in FIG. 2.

Referring to FIG. 2, a Rijke tube consists simply of a vertically oriented tube 51, often of copper or other metallic material, which is fitted near its lower end with a metallic gauze 53 extending completely across the tube cross-section. If the gauze is heated, either by means of electrical resistance heating (not shown) or by means of a flame 54 from a gas burner 55, an acoustic resonance is excited in the tube. This is caused by a transfer of heat from the gauze to air 56 passing through the gauze due to convection in the tube. The combination of the upward convection current with acoustic oscillation at the natural modes of the pipe results in more heat being transferred to the air when it is condensed than when it is rarefied, and if the energy gained from the gauze is greater than the energy lost at the tube ends and elsewhere, the resonant motion accumulates more and more energy (i.e. the resonance is forced) until energy gains and losses are in balance. The pipe sounds mainly at its fundamental "organ pipe" frequency. It should be noted that a gauze is not essential to the working of this experiment: a bare flame can be enough.

Stated broadly, this phenomena illustrates that sound waves passing through a heat source, whether a hot gauze of a flame, can be amplified by the heat source, leading to intense acoustic disturbances if the heat source is located inside, or in proximity to, a resonator. Since the reheat combustor 13 (FIG. 1) produces an intense flame within jet pipe 14 and in proximity to objects with their own resonant frequencies, such as flame gutter 47, it is here contended that the analogy between a Rijke tube and a reheat system subject to buzz is a fruitful one. It is further suggested that a similar useful analogy may be drawn between a Rijke tube and a combustion chamber such as 33.

The present invention arose from a consideration of the above factors, and stated broadly, we sugget control of the oscillation of combustion-driven resonators by changing the boundary conditions of the combustion process by means of an active control system utilising a phase-changing feed back loop. This control is effected by a suitable exciter, for example a vibrating diaphragm, which alters the boundary conditions and changes the nature of the fundamental oscillations by increasing the energy lost per cycle of oscillation to such an extend that the resonance can no longer build up.

The essence of the invention is the correction of the combustion instability which in gas turbine engines gives rise to the undesireable effects already noted. In the absence of the active control of the invention, it may be said that the combustion process is "negatively damped" and therefore unstable, but the active control adds a positive damping loop which renders the combustion stable. The invention is of course different in operation from known "anti-sound" techniques, since the invention actually eliminates the source of the noise problem rather than merely combats its effects. This can be appreciated if the preent disclosure is compared with a convenient review article of anti-noise techniques given by Professor B. Chaplin of the University of Essex in the English journal CME (Chartered Mechanical Engineer) for January 1983, pages 41 to 47, which is hereby incorporated by reference.

Figure 3:
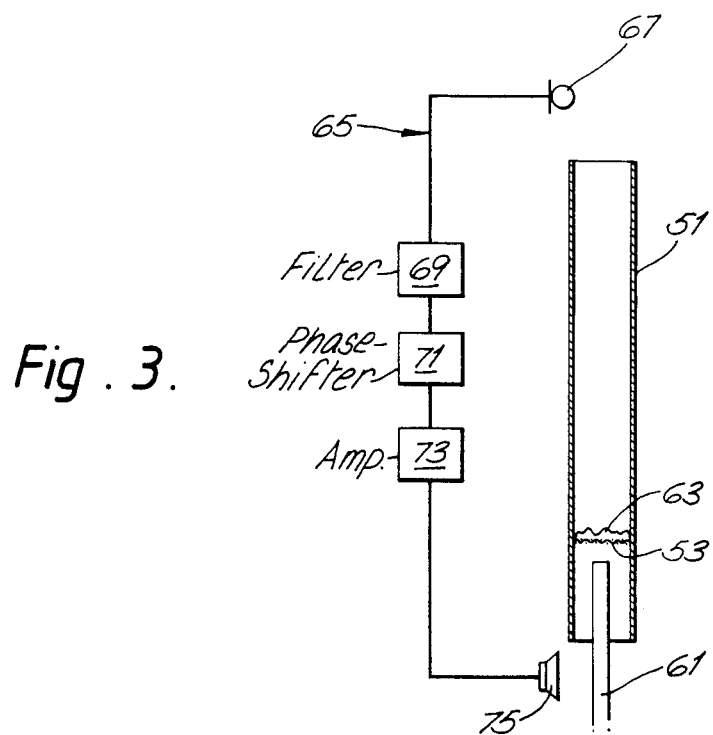
FIG. 3 is a cross-sectional diagram of a modified Rijke tube apparatus fitted with a sound control system.

The method of the invention has been successfully applied to cancel unstable combustion in a flame-driven Rijke tube as shown in FIG. 3. In FIG. 3, the tube 51 and optional gauze 53 are as described previously. However, the gas supply was fed by pipe 61 to a point within tube 51 underneath gauze 53 and was caused to burn as a flame 63 distributed over the top surface of gauze 53. In operation the tube 51 radiated sound mainly at its fundamental frequency, the flame 63 also manifesting visibly unstable combustion at this frequency. The control system was a closed feedback loop 65. A microphone 67 was located close to the top end of tube 51 (this end of the tube is furthest from the flame 63) to pick up the sound. The microphone signal was passed through an electronic filter 69 tuned to pass only the fundamental mode of the signal (corresponding to the fundamental mode of the tube 51), passed through variable phase-shifter 71, amplified in variable gain amplifier 73 and fed into a loudspeaker 75 located near the lower end of the tube 51. When the tube was resonating due to unstable combustion of flame 63 it was found that the unstable combustion, and hence the resonance, could be reducd or stopped at will by controlling the gain of amplifier 73 and the amount by which the phase-shifter 71 changed the phase of the incoming signal. Observation of the flame 63 showed that the visible unstable combustion was eliminated along with the noise, and it was also found that once stable combustion was achieved, the gain of amplifier 73 could be considerably reduced. This showed that the power needed to control the oscillation was much less once substantially stable combustion had been achieved because the source of the noise had been substantially eliminated; the loudspeaker 75 only had to deliver enough power to maintain stability, i.e. to prevent the oscillations from building up again. In known "anti-sound" systems the full anti-sound power must be maintained at all phases of operation because only the troublesome noise itself is combatted, not its source.

It is emphasised that the above-described experiment demonstrates both substantial elimination of the fundamental resonant frequency within the tube 51, and also substantial elimination of the dynamic heat exchange instability (as manifest in unstable combustion conditions in flame 63) which gives rise to the noise; by combatting the fundamental resonant frequency, the preferential heat transfer during condensations of the resonating air column at the gauze is substantially eliminated, and the losses at the boundaries of the system become greater than the heat input, causing stability to be maintained.

As an alternative to the use of the microphone 67 in the above experiment, a photomultiplier (not shown) could be utilised to view flame 63 via a mirror (not shown) positioned over the top of the tube 51. Like the microphone signal, the photomultiplier signal would include a component at the fundamental frequency of the combustion instabilities, and this different oscillating parameter of the process could be utilised in a similar control system to obtain the same results as above.

Returning to FIG. 1, we can now appreciate the embodiments of the invention. Looking at the reheat system first, during operation of the reheat combustor 13, noise in the jet pipe 14, including reheat buzz, is sensed by microphone 81 affixed to the external wall of the exhaust mixer annulus 15 near the flame gutter 47. The microphone is fixed so that it is well-cooled by the flow of bypass air around the mixer annulus. The signal from the microphone 81 is passed to control unit 82 mounted on the outer casing of the engine, where it is filtered by a low pass filter 83 (see inset) to allow only frequencies in the expected reheat buzz range through. Alter phase-change in a variable phase-shifter 85, the signal is amplified in a variable gain amplifier 87 and fed to an electromagnetically driven diaphragm 91 or heavy duty loudspeaker which forms part of the downstream (truncated) end of exhaust cone 11. The electromagnetic driver 92 for the diaphragm is housed within the exhaust cone. Conveniently, the signal is fed to the electromagnetic drive via a cable passing through a strut 12 which is one of the outlet guide vanes for the turbine 23.

The gain of the amplifier 87 and the setting of the phase shifter 85 are controlled automatically by a supervisory unit 93 which monitors the signal from the filter 83 to determine the strength (amplitude) of the signal and alters the gain of amplifer 87 and the phase change produced by phase-shifter 85 to obtain a signal from the filter 83 which is at a minimum. When the reheat buzz frequency is sensed, the control unit 82 adjusts the vibration of the diaphragm 91 to counteract the buzz frequency, thereby reducing the heat input driving the buzz frequency and adaptively controlling or even eliminating the buzz problem in a manner analogous to the process occurring in the controlled Rijke tube described above. Note that because the source of the reheat buzz problem is being dealt with, the continuous power rating required of the electromagnetic driver 92 when the combustion process has been stabilised will be much less than that required to initiate stabilization.

Variations on the above reheat buzz control system are possible. For example various oscillating parameters of the combustion-driven oscilliatory process could be sensed; the microphone 81 could be replaced by static or total pressure transducers which would monitor the pressure changes associated with the unstable combustion around flame gutter 47. Alternatively, microphone 81 could be replaced by a high-temperature light guide leading to a photodiode array mounted on the external casing of the engine. The photodiode array would directly monitor the frequency of the unstable combustion by its variable light emission, as mentioned for the Rijke tube. This woud have the advantage of avoiding the possibility of direct sound feedback from the diaphragm 91 to the microphone 81. As a further alternative a high-temperature piezo-electric vibration transducer could be attached to the outside of the exhaust mixer annulus 15 to pick up vibrations in the metal caused by the reheat buzz noise. Further, instead of a vibrating diaphragm 91 in the exhaust cone, it would be possible to incorporate one in the wall of the jet pipe 14.

As an alternative method of changing the boundary conditions of the unstable combustion process it would be possible to vibrate the flame gutter 47, again using known electromagnetic/electro-mechanical actuators. This would modulate the flow of fuel and combustion gases around the gutter 47.

A further possibility is the modulated addition of compressor bleed air to the turbine exhaust stream through a porous surface in the stream-say, a perforated portion of the exhaust cone 11 in the same position as diaphragm 91, the modulation being caused by a valve controlled by control unit 82 and working in controlled phase relationship to the buzz frequency. This would modulate the instantaneous fuel/air ratio in the combustion process. Perhaps a more likely method of achieving rapid modulation of the fuel/air ratio is that the fuel supply pressure to the reheat system could be modulated in controlled phase relationship to the buzz frequency. Again, this would correct the combustion instability (and hence the cyclically variable energy transfer to the buzz frequency) at its source.

The last-mentioned alternative of modulating the pressure of the fuel supply is specifically applied to combat combustion rumble in the main combustion system as shown in FIG. 1. The basic technique for effecting such fuel flow modulation is of course applicable to combatting either of the two manifestations of unstable combustion.

In the embodiment of the invention as applied to the main combustion system of the engine, pressure oscillations in the combustion chamber 33 caused by unstable combustion, as mentioned previously, are sensed by a vibration sensor 108 mounted on the inside of the combustion casing 109. The sensor 108 picks up all vibrations in the casing 109, including those caused by the combustion rumble phenomenon, and may conveniently be a high-temperature piezoelectric transducer. The fluctuating voltage produced by the sensor 108 in response to the vibrations is passed to control unit 110 mounted on the outer casing 105 of the engine. The control unit 110 is similar in its internal workings to control unit 82 already described, but differing in the details of its frequency filtering, since the frequencies it passes will be those of combustion rumble, which is a different frequency range from reheat buzz. The more detailed description of control unit 82, given above, will also suffice for control unit 110.

The output of control unit 110 is a signal capable of actuating an electromagnetically driven diaphragm (or piston) forming part of a small fuel-filled chamber 112 which communicates with the main fuel feed pipe 104. The diaphragm vibrates to modulate the feed pressure of the fuel to the burners 114 in the combustion chamber 33, the modulation being a waveform which is controlled by the control unit 110 to counteract the combustion rumble frequency, the wave-form's frequency and amplitude being continuously adapted by the control unit 110 so as to reduce the signal from sensor 108 to a minimum. This of course has the same beneficial effect as was described in connection with the control of reheat buzz by means of the vibrating diaphragm 91 in the exhaust cone, but the boundary condition of the combustion process which is changed is the instantaneous fuel feed pressure to the flame, and not the sound pressure level in the environment of the flame. An alternative way of achieving modulation of fuel feed pressure would be to utilise a solenoid-driven variable closure valve in the fuel feed pipe.

Although sensor 108 has been described as a piezoelectric transducer detecting vibrations in the combustor due to combustion rumble, it would be possible to sense the associated pressure fluctuations directly by means of a pressure probe connected to a suitable pressure transducer. The probe would be conveniently inserted through the wall of the combustion chamber 33 by means of one of the dilution air holes (not shown) and would be kept cool by the airflow past it. Again, a further possibility is to utilise an optical probe linked to a photo-diode array, as mentioned previously in connection with the reheat embodiment. With adequate cooling it would also be possible to locate a microphone as a sensor on the inside of the combustion casing 109 to sense combustion rumble noise.

Use of a loudspeaker-type exciter devices has not been mentioned in connection with the main combustion system due to perceived problems of incorporating such devices in or near the combustion chambers 33; nevertheless, use of vibrating diaphragm devices in order to counteract the combustion instability by transmission of pressure waves through the combustion gases in the combustion chamber should not be excluded from the ambit of the invention.

Although only one means of excitation per system has been mentioned above, e.g. a vibrating diaphragm, the invention should be taken as comprehending two or more such exciters sited in appropriate parts of the system if such proves to be necessary.

The control units 82 and 110 may utilise analogue electronics, but for speed of reaction and control it is preferred that they are digital in operation, controller 93 being a microprocessor and units 83 and 87 incorporating analogue-to-digital and digital-to-analogue converters as necessary.

We claim:

1. A combustion system for a gas turbine engine, the combustion system incorporating a feedback loop for the control of an unstable combustion process in the combustion system, the feedback loop including:

sensor means for sensing a cyclically varying parameter of the unstable combustion process and producing a signal corresponding thereto;
   control means for phase-shifting and amplifying the signal from the sensor means; and
   exciter means for changing the boundary conditions of the combustion process in accordance with the phase-shifted amplified signal;
   said control means including adaptive means for monitoring the strength of the sensor signal and varying the amount by which the signal is phase-shifted and amplified to obtain a sensor signal of minimum strength, whereby said unstable combustion is substantially eliminated.

2. A combustion system according to claim 1 in which the control means comprises:
   low pass filter means adapted to pass a predetermined range of frequencies of the cyclically varying parameter of the unstable combustion process;
   variable phase shifter means for phase-shifting the signal from the sensor means by a variable amount;
   a variable gain amplifier for amplifying the phase-shifted signal by a variable amount; and
   a supervisory unit for monitoring the strength of the signal from the low pass filter and altering the gain of the variable gain amplifier and the phase change produced by the variable phase shifter until the signal from the low pass filter is at a minimum.

3. A combustion system according to claim 1 in which the sensor means comprises vibration transducer means arranged to detect vibration in the combustion system due to the unstable process.

4. A combustion system according to claim 1 in which the sensor means comprises pressure transducer means arranged to detect pressure fluctuations in the combustion system due to the unstable combustion process.

5. A combustion system according to claim 4 in which the pressure transducer means is a microphone arranged to detect fluctuations in sound pressure level.

6. A combustion system according to claim 1 in which the sensor means comprises opto-electronic transducer means arranged to detect variable light emissions from the unstable combustion process.

7. A combustion system according to claim 1 in which the exciter means comprises means for modulating the flow of a fluid participating in the combustion process.

8. A combustion system according to claim 1 in which the exciter means comprises means for producing pressure fluctuations in a fluid participating in the combustion process.

9. A combustion system according to claim 1, the combustion system having fuel supply means incorporating the exciter means, the exciter means comprising a reciprocatory element adapted to superimpose pressure fluctuations on the fuel supply.

10. A combustion system according to claim 9, in which the reciprocatory element comprises an electromagnetically driven diaphragm.

11. A combustion system according to claim 8 in which the exciter means comprises a loudspeaker for producing fluctuations in sound pressure level in and near the combustion process.

12. A combustion system according to claim 1, the combustion system being a reheat combustor system.

* * * * *